(12) United States Patent
Criddle et al.

(10) Patent No.: US 8,635,611 B2
(45) Date of Patent: Jan. 21, 2014

(54) CREATING VIRTUAL APPLICATIONS

(75) Inventors: Jefferson B. Criddle, Bellevue, WA (US); Anthony Douglas Krueger, Woodinville, WA (US); John Sheehan, Somerville, MA (US); Joe Yap, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1578 days.

(21) Appl. No.: 11/941,292

(22) Filed: Nov. 16, 2007

(65) Prior Publication Data
US 2009/0133013 A1 May 21, 2009

(51) Int. Cl.
*G06F 9/445* (2006.01)
*G06F 15/16* (2006.01)

(52) U.S. Cl.
USPC .......................................... 717/177; 709/231

(58) Field of Classification Search
None
See application file for complete search history.

(56) References Cited

U.S. PATENT DOCUMENTS

| | | | |
|---|---|---|---|
| 5,604,906 A | 2/1997 | Murphy et al. | |
| 6,311,221 B1 * | 10/2001 | Raz et al. | 709/231 |
| 6,427,208 B1 | 7/2002 | Jordan et al. | |
| 6,560,776 B1 * | 5/2003 | Breggin et al. | 717/176 |
| 7,062,567 B2 | 6/2006 | Benitez et al. | |
| 7,096,253 B2 | 8/2006 | Vinson et al. | |
| 7,228,526 B2 | 6/2007 | Cohen et al. | |
| 7,743,063 B2 * | 6/2010 | James et al. | 707/752 |
| 7,779,027 B2 * | 8/2010 | James et al. | 707/769 |
| 8,245,185 B2 * | 8/2012 | Shapiro | 717/106 |
| 8,341,620 B2 * | 12/2012 | Criddle et al. | 717/174 |
| 8,413,134 B2 * | 4/2013 | Celli et al. | 717/174 |
| 8,510,734 B2 * | 8/2013 | Criddle et al. | 717/178 |
| 2002/0083183 A1 * | 6/2002 | Pujare et al. | 709/231 |
| 2002/0087717 A1 * | 7/2002 | Artzi et al. | 709/236 |
| 2002/0138640 A1 * | 9/2002 | Raz et al. | 709/231 |
| 2004/0139309 A1 * | 7/2004 | Gentil et al. | 713/1 |
| 2004/0230971 A1 * | 11/2004 | Rachman et al. | 717/175 |
| 2005/0033728 A1 * | 2/2005 | James et al. | 707/1 |
| 2005/0131971 A1 * | 6/2005 | James et al. | 707/205 |
| 2005/0210459 A1 | 9/2005 | Henderson et al. | |
| 2006/0031547 A1 * | 2/2006 | Tsui et al. | 709/231 |
| 2006/0161914 A1 * | 7/2006 | Morrison et al. | 717/174 |
| 2007/0011672 A1 | 1/2007 | Bhide et al. | |
| 2007/0106993 A1 | 5/2007 | Largman et al. | |

OTHER PUBLICATIONS

Microsoft Corporation, Microsoft® Office Ultimate 2007[online], Sep. 2006 [retrieved Jun. 24, 2011], Retrieved from Internet: <http://www.ccisd.com/9871048133928317/lib/9871048133928317/Office%202007/OfficeUltimate2007ProductGuide.pdf>, pp. 2-3.*

(Continued)

*Primary Examiner* — Dong Wong
*Assistant Examiner* — Todd Aguilera
(74) *Attorney, Agent, or Firm* — Merchant & Gould

(57) ABSTRACT

Embodiments are provided to create a virtual application or suite of virtual applications. In an embodiment, a system is configured to create a virtual package which includes information that can be used in a hosted virtual application environment. The system can provide bits of a virtual package based in part on user demand for an application or certain application functionality. In one embodiment, a system includes a sequencer component which can create a virtual package which includes information associated with setup-time and run-time changes made to a computing device. The sequencer component can use a number of extensible markup language (XML) files to create the virtual package. Other embodiments are available.

20 Claims, 3 Drawing Sheets

(56) References Cited

OTHER PUBLICATIONS

Softricity, Inc., Softricity® SoftGrid 3.2: Under the Covers, Exploring the SoftGrid Platform [online], Jun. 2005, Retrieved from Internet: <http://web.gccaz.edu/~rsiggs/work/Exploring-Softgrid.pdf>, whole document (title—p. 24).*

"Sequencing MS Office 2003", Date: Feb. 2007, http://infosysblogs.com/microsoft/2007/02/.

"Application Packaging: The Sequencer", Date Unknown, http://www.softricity.com/products/sequencer.asp.

"TechEd 2007: First Demos of Microsoft SoftGrid Application 'Sequencing", Date: Jun. 6, 2007, http://www.betanews.com/article/TechEd_2007_First_Demos_of_Microsoft_SoftGrid_Application_Sequencing/1181151969.

* cited by examiner

CREATING VIRTUAL APPLICATIONS

COPYRIGHT NOTICE

A portion of the disclosure of this patent document contains material, which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

BACKGROUND

Virtualization technology has been used to create virtual computing environments including virtual servers and virtual software applications. An end-user can access and use a virtual application from a remote location. Moreover, access to a virtual application can be controlled which may assist in circumventing piracy and other unauthorized uses. Accordingly, a user having required permissions can access a desired application from a dedicated server. However, current virtualization technology can require a significant amount of time and effort when creating a virtualized application since machine and other changes are typically manually identified and captured in real-time.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided to create a virtual application or suite of virtual applications, but the embodiments are not so limited. In an embodiment, a system is configured to create a virtual package which includes information that can be used in a virtual application environment. The system can provide bits of a virtual package based in part on user demand for an application or certain application functionality. Accordingly, the system can quickly provision a virtual package to a user without the user having to install an associated software application locally. In one embodiment, a system includes a sequencer component which can create a virtual package which includes information associated with setup-time and run-time changes made to a computing device. The sequencer component can use a number of extensible markup language (XML) files to create the virtual package.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Embodiments are configured to create and provide a virtual application or suite of virtual applications, but the embodiments are not so limited. In an embodiment, a system is configured to create a virtual package which can be used in a virtual application environment. The system can create and provide virtual applications and suites of applications based in part on existing software applications and suites, but the system is not so limited. For example, the system can be used to provide virtual packages that are associated with software applications, such as a word processing application, spreadsheet application, note-taking application, email application, database application, and other desired applications.

The system can provide a virtual application or application functionality based in part on user demand. For example, the system can operate to package bits of a virtual application based in part on user demand for an application or certain application functionality. The system can also be used to update a virtual package, including application patches and updates. Moreover, once bits associated with a virtual package have been provided to a client, a user can use the deployed bits while in an offline mode. Accordingly, the system can quickly provision a virtual package to a user without the user having to install an associated software application locally.

In another embodiment, a system includes a sequencer component which can be configured to create and provide functionality associated with a desired application. The sequencer component can be used to generate virtualized registry settings, dynamic link libraries (DLLs), initialization files, and other features which may be required to use a virtual package. In one embodiment, the sequencer component can be configured as a software program, including executable instructions, which can be used to provide a virtual application (see virtual application 24 of FIG. 3), but is not so limited.

The sequencer component can be further configured to define and create a number of feature or data blocks, wherein certain feature blocks, or portions thereof, can be provided to a client based on a current need or operation. The sequencer component can compile designated code blocks which enable a user to run a virtual application without having to download an entire package. Accordingly, the system can be used to provide virtualized software applications over a network to end-users. Correspondingly, a user can use a hosted virtualized application without having to install the software application locally. These and other embodiments are described below, and other embodiments are available.

Figure 1:
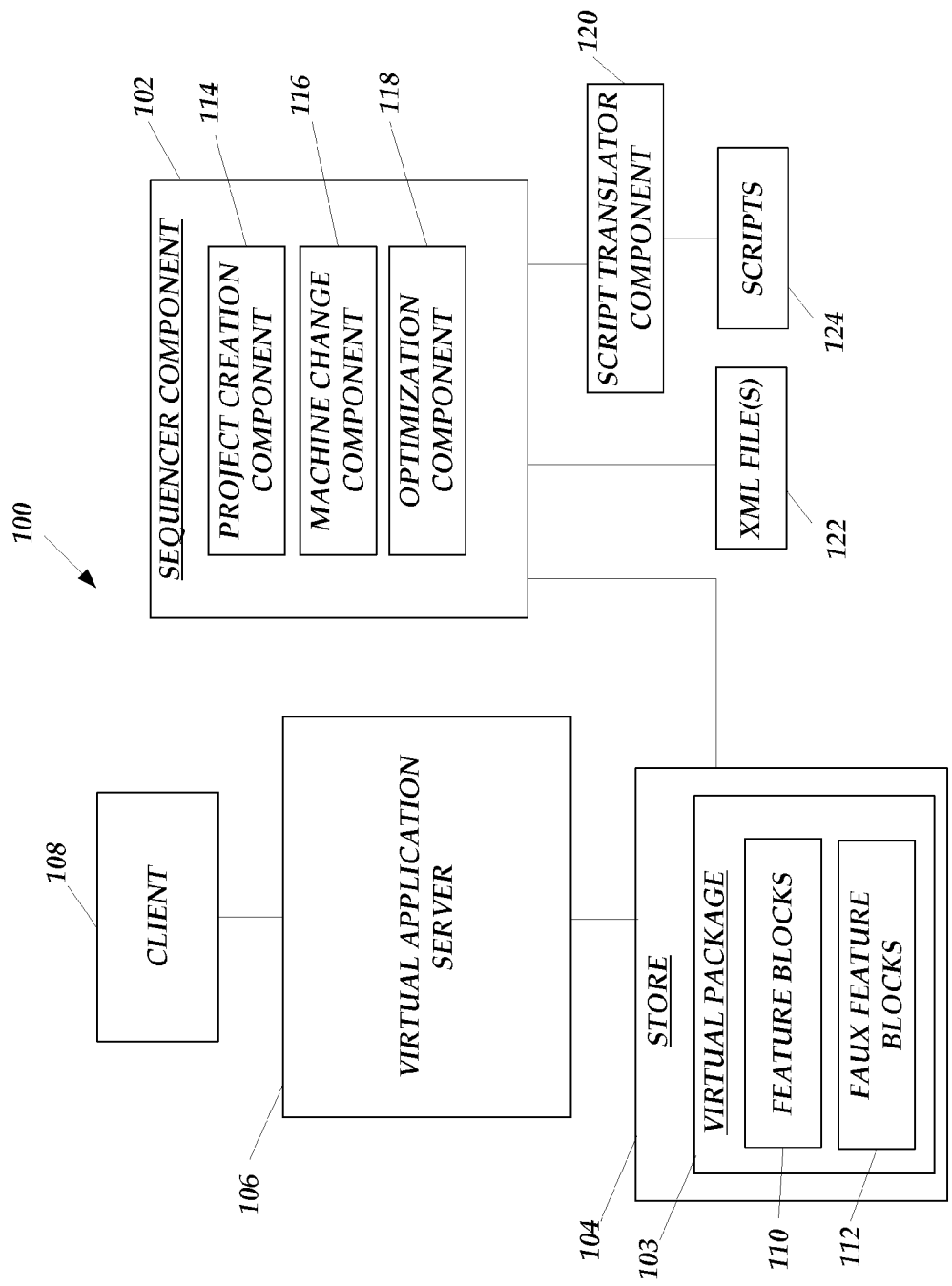
FIG. 1 depicts a block diagram of an exemplary system configured to provide a virtual application environment.

FIG. 1 is a block diagram of a system 100 configured to provide a virtual application to an end-user, according to an embodiment. As described below, components of the system 100 can be configured to provide a virtual application or suite of virtual applications, but the components are not so limited. In one embodiment, the system 100 can include functionality associated with the MICROSOFT® SOFTGRID® virtualization system, including sequencing code, headers, libraries, etc. A virtual application can include a virtualized instance of an application, such as a virtualized word processing application for example. A virtual application can also include a virtualized instance of a product, which can include multiple applications, such as a suite of applications (e.g., a virtual package may include a virtualized word processing application, virtualized spreadsheet application, virtualized presentation application, etc.)

As described below, components of the system 100 can be configured to provide a virtual package which can include Open Software Description (OSD) files, icon files, and, a softricity file type assigned to an image file (SFT file). The SFT file includes the bits for an associated virtualized product or application. An OSD file can be described as an extensible markup language (XML) file that describes how to load a virtual application. Each virtual application has a corresponding OSD file. When a user clicks on a shortcut for a virtual application, an associated OSD file is used to start the virtual application. Correspondingly, an OSD file can be used to describe an entry point to start an associated virtual application. The number of OSD files and icon files included in a virtual package correspond to the number of applications included in the virtual package. For example, a virtual package including a virtualized word processing application, virtualized spreadsheet application, and a virtualized presentation application will include all of the icons that each of those applications use and 3 OSD files. While a certain number and arrangement of components are shown in FIG. 1, the system 100 can include other configurations and functionality.

As shown in FIG. 1, the system 100 includes a sequencer component 102, a virtual package 103, a store 104, a virtual application server 106, and a client 108. As described below, the sequencer component 102 can operate to create a virtual package 103 for use by one or more clients, such as client 108 associated with a computing device, such as a desktop, laptop, handheld, or other computing device. Virtualized application data and other information can be stored in the store 104 and accessed when providing and using a virtual package 103. The store 104 can be configured as a dedicated storage repository, such as a dedicated server for example. For example, the store 104 can be configured as a SQL SERVER® and used to store virtualization information, such as records, applications, configuration details, licensing data, security details, reporting information, logging information, and other virtualization information.

The virtual application server 106 (hereinafter "server 106") can be configured to handle requests for applications, including specific application functions, when providing application data to the client 108. For example, the server 106 can be used to host a virtual application suite, wherein a user can use the client 108 to interact with one or more virtualized applications. As described below, the sequencer component 102 can be configured to create virtual packages, including virtualized application images or files, for use by a client, but is not so limited. For example, the sequencer component 102 can create a number of feature blocks which contain data and other information and are associated with a particular application function or functionality and can be stored to the store 104. The size of a feature block can also be configured by the sequencer component 102. For example, the size of a feature block may be determined based on a memory configuration, bandwidth, load, and other operational considerations. Once created, the server 106, or other network component, can retrieve a virtual package 103 from the store 104, which can then be communicated to the client 108.

In one embodiment, the server 106 can be configured to communicate a number of bits associated with one or more feature blocks to the client 108 over a network. For example, the server 106 can be used to provide application data and code in blocks or chunks over a distributed computing network to the client 108. The client 108 can use the application data and associated bits when presenting a virtualized application to an end-user. In one embodiment, the client 108 can be configured as a virtual console or other user interface (UI) for interacting with a virtualized application or image. The client 108, which includes remote and local configurations, can be used to interact with the virtual package 103.

As described briefly above, the sequencer component 102 can be configured to create a virtual package 103 which can be provided to an end-user. For example, the sequencer component 102 can create virtualized database applications, virtualized word processing applications, virtualized email applications, virtualized spreadsheet applications, and other virtualized applications. A virtualized application can be configured to operate independent of an operating system (OS) and any other applications on the client computing device. Additionally, the sequencer component 102 can be used to create applications patches and updates. The sequencer component 102 can be executed using a dedicated computing device. In another embodiment, the functionality of the sequencer component 102 can be included with another component of the system 100, such as server 106 for example.

The sequencer component 102 can be configured to provide registry settings, dynamic link libraries (DLLs), initialization files, and other features which can be included as part of the virtual package 103. As described briefly above, the sequencer component 102 can be further configured to define and create a number of feature blocks 110, wherein certain feature blocks, or portions thereof, can be used by the client 108 based on a current need or operation. The sequencer component 102 can compile and provide one or more feature blocks 110, including blocks of code, which enable a user to run an application without having to download or install an entire application.

In one embodiment, the sequencer component 102 can be configured to compile a code block and associated bits that will be used to launch and provide a virtualized application. For example, the sequencer component 102 can be used to provide a first feature block (FB1) which includes number of associated blocks defining essential code and bits required to boot and launch a virtualized application. Continuing with the example, the sequencer component 102 can also provide a second feature block (FB2) which can include any remaining bits or blocks which are not required to boot or launch the virtualized application, but provide further application functionality. For example, bits associated with pivot table operations of a spreadsheet application can be stored in the second feature block, since the pivot table bits may not be required to launch the spreadsheet application. The bits associated with the pivot table operations can be provided on demand when a pivot operation occurs.

Faux feature blocks 112 can be used to identify blocks of data or particular bits that are directed to a particular application or functionality. For example, four different faux feature blocks may be used respectively for a spreadsheet application, a word processing application, a database application, and an email application. One or more faux feature blocks 112 can include a list of data, metadata, and/or other information that the client 108 may require to provide an application or certain functionality. A faux feature block can be used to define one or more data blocks which need to be downloaded before executing a particular scenario, command, or other operation. For example, a faux feature block may refer to parts of another feature block to be associated with a particular operation required by a user.

Additionally, the faux feature blocks 112 can be used to prioritize application downloads by a client and minimize out of sequence bit requests. For example, a faux feature block may include a mapping which points to particular blocks of FB1 and/or FB2 which can be used when prioritizing bit downloads. FB1 can be described as a set of blocks required before any virtual application may start. FB2 can be described as all of the other blocks and information. Every code block in an image (SFT) can be included in FB1 or FB2. The faux feature blocks 112 allow for a dynamic reprioritization of blocks at run time. For example, a virtual spreadsheet application uses a spd.dll file to boot, whereas the other virtual applications do not require the spd.dll file. By including the spd.dll file in a virtual spreadsheet application boot faux feature block, a download penalty does not extend to the other applications that do not need the spd.dll.

Correspondingly, a user or virtual application does not have to wait for the FB1 and/or FB2 to be completely downloaded before a user can interact with a particular application. Faux feature blocks 112 can also include redundant data blocks and/or instructions or directives. For example, the sequencer component 102 may define two faux feature blocks, faux feature block A and faux feature block B. Rather than sharing a single block of code, faux feature blocks A and B may include the same code that different applications require to launch (e.g., .dll files). Correspondingly, the same data or code block can be included in multiple faux feature blocks. As shown in FIG. 1, a plurality of feature blocks 110 and faux feature blocks 112 can be included in the virtual package 103. In one embodiment, faux feature blocks 112 can be included as part of the data structure of the feature blocks 110.

As described below, the sequencer component 102 can include one or more handling components or handlers that can be configured to extract information from an XML data structure. The extracted information can be used to generate the virtual package 103. With continuing reference to FIG. 1, the sequencer component 102 can be configured to include one or more handlers including a project creation (PC) component 114, a machine change (MC) component 116, and/or an optimization component 118.

The PC component 114 can be used as a first step when creating a virtual package 103 from scratch. The PC component 114 can be configured to create an empty virtual package, open an existing virtual package, add package details, remove package details, update package details, and/or save and re-save a virtual package, but is not so limited. In an embodiment, the PC component 114 can be configured to use an XML file which can include details associated with a project, including new and existing projects. In one embodiment, the PC component 114 can be configured to read a package details (PD) XML file which describes certain package details when creating a new empty project or editing details of an existing project.

The MC component 116 can be configured to provide machine-related changes to a virtual package 103, such as changes made to aspects of a computing device at run-time or during set-up. For example, the MC component 116 can be used to add information to a virtual package 103 associated with changes to files, folders, registries, and/or properties of items in the virtual package 103. The MC component 116 can also be configured to remove machine changes and/or modify properties associated with certain machine changes. In an embodiment, the MC component 116 can be configured to use XML which describes certain machine changes when performing operations associated with the creation of a virtual package 103. In one embodiment, the MC component 116 can be used to parse XML which describes all machine changes associated with an installation process. The parsed XML can be used to add and remove files, folders, and registries as part of the creation of a virtual package 103.

The optimization component 118 can be configured to use an XML file to provide feature block information for inclusion in a virtual package 103. The XML file can include information associated with a number and arrangement of feature blocks 110, including faux feature blocks 112. In an embodiment, the optimization component 118 can be configured to operate on an existing virtual image and an XML file describing faux feature blocks 112 to apply optimization data to files and folders in a virtual image. In one embodiment, the optimization component 118 can be configured to partition file blocks within the virtual package 103 into one or more feature blocks, such as a first feature block, a second feature block, and one or more faux feature blocks. For example, the optimization component 118 can partition blocks between FB1 and FB2 by marking each block with an associated FB number.

As described briefly above, feature blocks 110, including faux feature blocks 112, can be used to provide a faster download mechanism (Play) than page faults (Out of Sequence) (e.g., difference in download speed can be 4 times or more). For example, a first feature block (e.g., FB1) can be downloaded using a single Play request before booting any applications. Moreover, feature blocks 110 and faux feature blocks 112 can be used to improve boot and feature performance over slower networks by using more efficient Play requests when launching an application or when launching a resource-intensive feature within an application. One or more faux feature blocks 112 can be used to download the optimal set of bits required to launch an application or feature, thereby providing an intelligent, predictable user-interface (UI) during the download.

A faux feature block can be configured to be downloaded as a feature block, but may not be implemented as a true feature block. Examples of faux feature blocks include a word processing application boot, a spreadsheet application boot, English proofing files, Japanese input method editor (IME) files, etc. In one embodiment, multiple faux feature blocks can include the same data. Data associated with one or more faux feature blocks can be stored in a file within a virtual package 103, such as a virtual image. Correspondingly, the client 108 can read the image and use the information in the file to request specific parts of the image to be downloaded with a single Play request before starting an application or feature.

As shown in FIG. 1, the system 100 can also include a script translator component 120. The script translator component 120 can be used to create machine independent tools configured to provide an application image which can be used with disparate systems. In an embodiment, the script translator component 120 can be configured to use one or more scripts to provide an XML data structure, including one or more XML files, which can be input and used by the sequencer component 102 to create a virtual package 103. The script translator component 120 can be configured to use a number of scripts to determine files, folders, registries, and other information associated with an installation process. Conditional logic, custom actions, and other information can be removed from a script or script file when crafting the XML data structure.

When operating, the script translator component 120 can be configured to enumerate each record of a script or script file. For example, the script translator component 120 can use a table of operational codes ("opcodes") to identify certain records, including important records and/or unimportant records, which can be used in the creation of a virtual package 103, including applications images. The script translator component 120 can use opcodes and other information to skip or ignore unimportant records and other information when providing the XML data structure, which can minimize the amount of XML required to provide the XML data structure. Accordingly, the script translator component 120 can minimize the size of the XML data structure while tailoring the information to be included in a particular virtual package.

Listed below are a number of example opcodes which can be used by the script translator component 120 when mapping information to the XML data structure.

```
ActionStart
AssemblyCopy
AssemblyPublish
CacheSizeFlush
ChangeMedia
CleanupConfigData
ComponentPublish
ComponentRegister
CustomActionSchedule
DatabaseCopy
DialogInfo
End
FeaturePublish
FileCopy
FolderCreate
Header
IconCreate
IniFilePath
IniWriteRemoveValue
ODBCDriverManager
ProductCPDisplayInfoRegister
ProductInfo
ProductPublish
ProductPublishClient
ProductRegister
ProgressTotal
RegAddValue
RegAppIdInfoRegister
RegClassInfoRegister
RegisterPatchOrder
RegOpenKey
RegProgIdInfoRegister
RollbackInfo
ServiceControl
ServiceInstall
SetBaseline
SetSourceFolder
SetTargetFolder
ShortcutCreate
SourceListPublish
SourceListRegisterLastUsed
TypeLibraryRegister
UpgradeCodePublish
UserRegister
As an example, an install script may include:
SetTargetFolder(Folder=C:\MsiTest\TextFile\MsiHtml\)
SetSourceFolder(Folder=1\TextFile\MsiHtml\)
FileCopy(SourceName=msi.htm|msi.html,SourceCabKey=
Msi_html.3C9226CF_053D_4428_B52A_BD3C6CBBF141,
DestName=msi.html,Attributes=0,FileSize=48,PerTick=32768,,
VerifyMedia=1,,,,CheckCRC=0,,,InstallMode=58982400,
HashOptions=0,HashPart1=-376572345,
HashPart2=-1355131776,HashPart3=-810189817,
HashPart4=545007602,,)
```

Using the example script, the script translator 120 can create an XML data structure based on the script, wherein the XML data structure corresponds with a MCXML file, as follows:

```
<FileSystem>
  <file>
    <source>
      <sourceFolder>{Location of MSI}\TextFile\MsiHTML</sourceFolder>
      <sourceName>msi.html</sourceName>
      <sourceCabKey>
        Msi_html.3C9226CF_053D_4428_B52A_BD3C6CBBF141
      </sourceCabKey>
    </source>
    <target>
      <targetFolder>C:\MsiTest\TextFile\MsiHtml</targetFolder>
      <targetName>msi.html</targetName>
    </target>
    <FileAttributes>0</FileAttributes>
    <FileSize>48</FileSize>
  </file>
</FileSystem>
```

In one embodiment, the script translator component 120 can be configured to create a machine change XML (MCXML) file based in part on a number of binary installation scripts. A binary installation script provides information as to what files, folders, and registry keys are to be included as part of an installation. As described below, a MCXML file can be configured to describe adding or removing items from a virtual package, but is not so limited. Adding an item that already exists but with different properties operates to update the item with the new properties.

The script translator component 120 can operate to parse an installation script for the associated information when creating and saving a XML file. For example, the script translator component 120 can operate to convert scripts generated from one or more installer files associated with an installation of a product to the XML format which can be consumed and used by the MC component 116. For example, the script translator component 120 can operate to translate an installation script to produce a MCXML file. As an example, installation scripts can be obtained by running a setup of a requested product (e.g., Msiexec/I Word.en-us.msi/qb SCRIPTFILE=% TMP %\Word.en-us.aas) for each installer file, such as MICROSOFT® installer (MSI) files.

The sequencer component 102 can use a number of XML files 122 and/or scripts 124 when creating a virtual package 103. In an embodiment, a MCXML file can be input to the sequencer component 102 and used to generate a virtual package 103, including one or more virtual application images. The MCXML can be created by using the script translator component 120 as described above. The MC component 116 can use aspects of the MCXML file as part of creating a virtual package 103. For example, the MCXML file can be used to describe changes to a machine that an installation would have made.

In one embodiment, a MCXML file can be defined according to the schema below.

```
<?xml version="1.0" encoding="utf-8"?>
<xs:schema xmlns="http://tempuri.org/MachineChanges.xsd"
  xmlns:xs="http://www.w3.org/2001/XMLSchema">
  <xs:element name="MachineChanges">
    <xs:complexType>
      <xs:sequence>
        <xs:element name="FileSystem" maxOccurs="1" minOccurs="1">
          <xs:complexType>
            <xs:choice minOccurs="0" maxOccurs="unbounded">
              <xs:element name="File">
                <xs:complexType>
```

```
                <xs:sequence>
                  <xs:element name="Source">
                    <xs:complexType>
                      <xs:sequence>
                        <xs:element    name="SourceFolder"    type="xs:string"
maxOccurs="1" />
                        <xs:element    name="SourceName"    type="xs:string"
maxOccurs="1" />
                        <xs:element    name="SourceCabKey"    type="xs:string"
maxOccurs="1" />
                        <xs:element    name="SourceCabFile"    type="xs:string"
maxOccurs="1">
                        </xs:element>
                      </xs:sequence>
                    </xs:complexType>
                  </xs:element>
                  <xs:element name="Target">
                    <xs:complexType>
                      <xs:sequence>
                        <xs:element      name="TargetName"      type="xs:string"
maxOccurs="1" />
                        <xs:element      name="TargetFolder"     type="xs:string"
maxOccurs="1" />
                      </xs:sequence>
                    </xs:complexType>
                  </xs:element>
                  <xs:element name="FileAttributes" type="xs:int" />
                  <xs:element name="FileSize" type="xs:int" />
                  <xs:element name="SoftricityFileType" type="xs:string" />
                  <xs:element name="Permanent" type="xs:boolean" />
                  <xs:element name="Override" type="xs:boolean" />
                </xs:sequence>
                <xs:attribute name="Remove" type="xs:boolean" default="0" />
              </xs:complexType>
            </xs:element>
          </xs:choice>
        </xs:complexType>
      </xs:element>
      <xs:element name="Registry" maxOccurs="1" minOccurs="1">
        <xs:complexType>
          <xs:choice minOccurs="0" maxOccurs="unbounded">
            <xs:element name="KeyAction">
              <xs:complexType>
                <xs:sequence>
                  <xs:element name="Key" type="xs:string" />
                  <xs:element name="Name" type="xs:string" />
                  <xs:element name="Value">
                    <xs:complexType>
                      <xs:simpleContent>
                        <xs:extension base="xs:string">
                          <xs:attribute      name="ValueType"      type="xs:string"
default="REG_SZ" />
                        </xs:extension>
                      </xs:simpleContent>
                    </xs:complexType>
                  </xs:element>
                </xs:sequence>
                <xs:attribute name="Remove" type="xs:int" default="0" />
              </xs:complexType>
            </xs:element>
          </xs:choice>
        </xs:complexType>
      </xs:element>
    </xs:sequence>
  </xs:complexType>
</xs:element>
</xs:schema>
```

The elements of the MCXML schema are as follows:

FileSystem Element

This element can be used to represent files and/or folders that will be added, removed, or modified in a virtual image, such as a SFT file for example. This element may be empty which indicates that no changes to the file system will be made.

File Element

This element can be used to represent a single add, remove, or edit of a file or folder. There is an optional remove attribute to this element. Remove can be 0 (meaning do not remove) or 1 (remove this file or folder). As defined in the schema, if missing the attribute, the default is remove="0".

Source Element (Optional)

This element can be used as a container for the next three elements which together define where to get a file from for the virtual image. If it is a remove action, there is no need for anything under this element. Even if not a remove action, this element may be optional and not required for an action that changes the file type property for example. However, if it is an edit action and the target file does not exist in the virtual image and is not mentioned under this element, the MC component 116 can log that it was unable to edit the file and move on to the next one.

SourceFolder Element

This element can be used to describe a folder where a file is located and can be represented as an absolute path. This element can point to a file on a local machine, a file in a cabinet (CAB), or a universal naming convention (UNC) path. This element can be used in conjunction with Source-Name element below.

SourceName Element

The name of a file to be added to a virtual image.

SourceCabFile Element

This element can be used to identify a CAB file where a file is obtained from. Used in conjunction with the Source-CabKey element.

SourceCabKey Element (Optional)

If the source file is in a CAB, this element provides information on how to obtain the source file (the SourceCabKey is a primary key in the CAB).

Target Element

The elements under the target element describe where a file should be located in a virtual image. The MC component 116 can log and skip over any file elements without a target element.

TargetFolder Element

This element can be used to describe a folder in a virtual image. A folder can be created if not yet in existence.

TargetName Element

This element can correspond with a name of a file to be added into a virtual image. If the file action is removing or adding an entire directory, this element can be ignored by the MC component 116. If the action is to add a file and this element is missing (or invalid), the MC component 116 can use a value associated with the SourceName element.

FileAttributes Element

This element can be used to indicate what attributes the file/folder may have: Ready Only, Hidden, etc. If not provided, the MC component 116 can use a default value of zero.

FileSize Element (Optional)

Since install scripts can be used to provide the file system, the information can be included into a virtual image index without having to find the size. If this property is missing and a file is being added, then the MC component 116 can retrieve the information from the source file.

SoftricityfileType (Optional)

Files/Folders can be Application data, application configuration, user data, or user configuration data types in an SFT image file. If missing, the MC component 116 can use a default value of Application data.

Permanent Flag

The Permanent flag can be used to force the preservation of any client changes, even if there are changes made on the sequencer component 102 during a package upgrade.

Override Flag

The Override flag can be used to force the replacement of any client changes with changes made on the sequencer component 102 during package upgrade.

Registry Element

This element can be used to represent all registry changes captured in a virtual registry. Elements under this element describe adds, edits, and removals of keys and/or names and values. This element can be optional. If not present, no changes will be made to the virtual registry.

KeyAction Element

Each KeyAction element can be used to describe a change to a virtual registry which may be an add, edit, or a removal. There is an optional remove attribute to this element. Remove can be any of the following: 0—meaning do not remove, 1—remove all child keys and name/value pair and make this key a tombstone, or 2—remove this key (and everything under it) completely from the virtual registry. If missing or invalid, the MC component 116 will default to zero.

Key Element

This element contains a full key name, including the appropriate hive key HKEY part at the front. An HKEY is a top level machine registry key. For example, top level HKEYs can include HKEY_CURRENT_USER, HKEY_LOCAL_MACHINE, HKEY_CLASSES_ROOT, and HKEY_USERS. The key element can be required for every KeyAction element. If missing, the MC component 116 will log this fact and skip to the next action.

Name Element (Optional)

This is the name part of a name/value pair under the above key. If missing, then the action represents an action to the key itself, not a name/value pair.

Value Element (Optional)

This element may not be required when removing a key or a name/value pair. Also, it may not be required if an action represents an edit to a virtualize property of the key. It can be required when adding a new name/value pair and the MC component 116 can log an error and skip to a next file if an attempt is made to add a name without a value. The ValueType attribute can be used to represent a type of value: String, binary, double word (DWORD), etc. A missing (or invalid) type attribute can be interpreted by the MC component 116 as String type (REG_SZ).

An example MCMXL file is shown below. The example MCXML file was dynamically generated from an installation source using the script translator component 120. As shown below, the example MCXML file can be used to represent machine change information which the sequencer component 102 can use to create a virtual package.

```
<?xml version="1.0" encoding="utf-8" ?>
- <MachineChanges>
  - <FileSystem>
    - <File>
      - <Target>
          <TargetFolder>C:\Program Files\Common Files\Microsoft Shared\OFFICE\Office Setup Controller\Office.en-us\</TargetFolder>
          <TargetName>OfficeMUISet.XML</TargetName>
        </Target>
```

-continued

```xml
- <Source>
    <SourceCabFile>\\tykr-o14\Public\AAS\200X-10-01\12\AAS\OfficeLR.CAB</SourceCabFile>
    <SourceCabKey>PACKAGE.XML_90011504090000</SourceCabKey>
  </Source>
  <FileAttributes>8192</FileAttributes>
  <FileSize>821</FileSize>
  </File>
- <File>
- <Target>
    <TargetFolder>C:\Program Files\Common Files\Microsoft Shared\OFFICE\Office Setup Controller\Office.en-us\</TargetFolder>
    <TargetName>SETUP.XML</TargetName>
  </Target>
- <Source>
    <SourceCabFile>\\tkr-o14\Public\AAS\200X-10-01\12\AAS\OfficeLR.CAB</SourceCabFile>
    <SourceCabKey>SETUP.XML_90011504090000</SourceCabKey>
  </Source>
  <FileAttributes>8192</FileAttributes>
  <FileSize>196</FileSize>
  </File>
- <File>
- <Target>
    <TargetFolder>C:\WINDOWS\Installer\</TargetFolder>
    <TargetName>34995.msi</TargetName>
  </Target>
  <Source />
  </File>
  </FileSystem>
- <Registry>
- <KeyAction>
    <Key>HKEY_LOCAL_MACHINE\Software\Classes\Installer\Products\00002109511090400000000000F01FEC</Key>
    <Name>AdvertiseFlags</Name>
    <Value ValueType="REG_DWORD">388</Value>
  </KeyAction>
- <KeyAction>
    <Key>HKEY_LOCAL_MACHINE\Software\Classes\Installer\Products\00002109511090400000000000F01FEC</Key>
    <Name>Clients</Name>
    <Value ValueType="REG_MULTI_SZ">:</Value>
  </KeyAction>
- <KeyAction>
    <Key>HKEY_LOCAL_MACHINE\Software\Classes\Installer\Products\00002109511090400000000000F01FEC</Key>
    <Name>DeploymentFlags</Name>
    <Value ValueType="REG_DWORD">3</Value>
  </KeyAction>
- <KeyAction>
    <Key>HKEY_LOCAL_MACHINE\Software\Classes\Installer\Products\00002109511090400000000000F01FEC</Key>
    <Name>Assignment</Name>
    <Value ValueType="REG_DWORD">1</Value>
  </KeyAction>
- <KeyAction>
    <Key>HKEY_LOCAL_MACHINE\Software\Classes\Installer\Products\00002109511090400000000000F01FEC</Key>
    <Name>AuthorizedLUAApp</Name>
    <Value ValueType="REG_DWORD">0</Value>
  </KeyAction>
- <KeyAction>
    <Key>HKEY_LOCAL_MACHINE\Software\Classes\Installer\Products\00002109511090400000000000F01FEC</Key>
    <Name>InstanceType</Name>
    <Value ValueType="REG_DWORD">0</Value>
  </KeyAction>
- <KeyAction>
    <Key>HKEY_LOCAL_MACHINE\Software\Classes\Installer\Products\00002109511090400000000000F01FEC</Key>
    <Name>Language</Name>
    <Value ValueType="REG_DWORD">1033</Value>
  </KeyAction>
- <KeyAction>
    <Key>HKEY_LOCAL_MACHINE\Software\Classes\Installer\Products\00002109511090400000000000F01FEC</Key>
    <Name>Version</Name>
    <Value ValueType="REG_DWORD">201331110</Value>
  </KeyAction>
```

-continued

```
- <KeyAction>
    <Key>HKEY_LOCAL_MACHINE\Software\Classes\Installer\Products\
00002109511090400000000000F01FEC</Key>
    <Name>ProductName</Name>
    <Value>Microsoft Office Shared Setup Metadata MUI (English) </Value>
  </KeyAction>
- <KeyAction>
    <Key>HKEY_LOCAL_MACHINE\Software\Classes\Installer\Products\
00002109511090400000000000F01FEC</Key>
    <Name>PackageCode</Name>
    <Value>B10E890BF1F7CD84A8D622349E24DFF6</Value>
  </KeyAction>
- <KeyAction>
    <Key>HKEY_LOCAL_MACHINE\Software\Microsoft\Windows\CurrentVersion\
Installer\UserData\S-1-5-18\Components\00002109511090400000E0239E6F5E85</Key>
    <Name>00002109511090400000000000F01FEC</Name>
    <Value>02:\Software\Microsoft\Office\xx.0\Common\Setup\OnDemand\Publish
ComponentGuid\90120000-0115-0409-0000-0000000FF1CE\</Value>
  </KeyAction>
- <KeyAction>
    <Key>HKEY_LOCAL_MACHINE\Software\Microsoft\Windows\CurrentVersion\
Installer\UserData\S-1-5-18\Components\000021095110904000000000A0FE51DCC7</Key>
    <Name>00002109511090400000000000F01FEC</Name>
    <Value>02:\Software\Microsoft\Office\xx.0\Common\InstalledPackages\90120000-
0115-0409-0000-0000000FF1CE\</Value>
  </KeyAction>
- <KeyAction>
    <Key>HKEY_LOCAL_MACHINE\Software\Microsoft\Windows\CurrentVersion\
Installer\UserData\S-1-5-18\Components\C69590C5511092647B054852F5369A15</Key>
    <Name>00002109511090400000000000F01FEC</Name>
    <Value>C:\Program Files\Common Files\Microsoft Shared\OFFICE\Office
Setup Controller\Office.en-us\OfficeMUISet.XML</Value>
  </KeyAction>
- <KeyAction>
    <Key>HKEY_LOCAL_MACHINE\Software\Microsoft\Windows\CurrentVersion\
Installer\UserData\S-1-5-18\Components\C69590C5511092647B054852F5369A25</Key>
    <Name>00002109511090400000000000F01FEC</Name>
    <Value>C:\Program Files\Common Files\Microsoft Shared\OFFICE\Office
Setup Controller\Office.en-us\SETUP.XML</Value>
  </KeyAction>
- <KeyAction>
    <Key>HKEY_LOCAL_MACHINE\Software\Microsoft\Office\xx.0\Common\Setup\
OnDemand\PublishComponentGuid\90120000-0115-0409-0000-0000000FF1CE</Key>
    <Name />
    <Value            ValueType="REG_SZ">5D99B316-7DFC-4BCF-97B3-
050068BB1431<Value>
  </KeyAction>
- <KeyAction>
    <Key>HKEY_LOCAL_MACHINE\Software\Microsoft\Office\xx.0\Common\Installed
Packages\90120000-0115-0409-0000-0000000FF1CE</Key>
    <Name />
    <Value ValueType="REG_SZ">Microsoft Office Shared Setup Metadata MUI
(English) </Value>
  </KeyAction>
- <KeyAction>
    <Key>HKEY_LOCAL_MACHINE\Software\Microsoft\Office\xx.0\Common\Installed
Packages\90120000-0115-0409-0000-0000000FF1CE</Key>
    <Name>ProductLanguage</Name>
    <Value ValueType="REG_SZ">1033</Value>
  </KeyAction>
- <KeyAction>
    <Key>HKEY_LOCAL_MACHINE\Software\Microsoft\Office\xx.0\Common\Installed
Packages\90120000-0115-0409-0000-0000000FF1CE</Key>
    <Name>ProductVersion</Name>
    <Value ValueType="REG_SZ">12.0.4518.1014</Value>
  </KeyAction>
- <KeyAction>
    <Key>HKEY_LOCAL_MACHINE\Software\Microsoft\Windows\CurrentVersion\
Installer\UserData\S-1-5-
18\Products\00002109511090400000000000F01FEC\InstallProperties</Key>
    <Name>DisplayName</Name>
    <Value>Microsoft Office Shared Setup Metadata MUI (English) </Value>
  </KeyAction>
- <KeyAction>
    <Key>HKEY_LOCAL_MACHINE\Software\Microsoft\Windows\CurrentVersion\
Installer\UserData\S-1-5-
18\Products\00002109511090400000000000F01FEC\InstallProperties</Key>
    <Name>Language</Name>
    <Value ValueType="REG_DWORD">1033</Value>
  </KeyAction>
```

-continued

```xml
- <KeyAction>
    <Key>HKEY_LOCAL_MACHINE\Software\Microsoft\Windows\CurrentVersion\Installer\UserData\S-1-5-18\Products\00002109511090400000000000F01FEC\InstallProperties</Key>
        <Name>Version</Name>
        <Value ValueType="REG_DWORD">201331110</Value>
    </KeyAction>
- <KeyAction>
    <Key>HKEY_LOCAL_MACHINE\Software\Microsoft\Windows\CurrentVersion\Installer\UserData\S-1-5-18\Products\00002109511090400000000000F01FEC\InstallProperties</Key>
        <Name>DisplayVersion</Name>
        <Value>12.0.4518.1014</Value>
    </KeyAction>
- <KeyAction>
    <Key>HKEY_LOCAL_MACHINE\Software\Microsoft\Windows\CurrentVersion\Installer\UserData\S-1-5-18\Products\00002109511090400000000000F01FEC\InstallProperties</Key>
        <Name>Publisher</Name>
        <Value>Microsoft Corporation</Value>
    </KeyAction>
- <KeyAction>
    <Key>HKEY_LOCAL_MACHINE\Software\Microsoft\Windows\CurrentVersion\Installer\UserData\S-1-5-18\Products\00002109511090400000000000F01FEC\InstallProperties</Key>
        <Name>EstimatedSize</Name>
        <Value ValueType="REG_DWORD">502</Value>
    </KeyAction>
- <KeyAction>
    <Key>HKEY_LOCAL_MACHINE\Software\Microsoft\Windows\CurrentVersion\Installer\UserData\S-1-5-18\Products\00002109511090400000000000F01FEC\InstallProperties</Key>
        <Name>NoModify</Name>
        <Value ValueType="REG_DWORD">1</Value>
    </KeyAction>
- <KeyAction>
    <Key>HKEY_LOCAL_MACHINE\Software\Microsoft\Windows\CurrentVersion\Installer\UserData\S-1-5-18\Products\00002109511090400000000000F01FEC\InstallProperties</Key>
        <Name>SystemComponent</Name>
        <Value ValueType="REG_DWORD">1</Value>
    </KeyAction>
- <KeyAction>
    <Key>HKEY_LOCAL_MACHINE\Software\Microsoft\Windows\CurrentVersion\Installer\UserData\S-1-5-18\Products\00002109511090400000000000F01FEC\InstallProperties</Key>
        <Name>WindowsInstaller</Name>
        <Value ValueType="REG_DWORD">1</Value>
    </KeyAction>
- <KeyAction>
    <Key>HKEY_LOCAL_MACHINE\Software\Microsoft\Windows\CurrentVersion\Installer\UserData\S-1-5-18\Products\00002109511090400000000000F01FEC\Features</Key>
        <Name>Gimme_OnDemandData</Name>
        <Value>vUpAVK+8A$i@M*4G?[XD</Value>
    </KeyAction>
- <KeyAction>
    <Key>HKEY_LOCAL_MACHINE\Software\Classes\Installer\Features\00002109511090400000000000F01FEC</Key>
        <Name>Gimme_OnDemandData</Name>
        <Value />
    <KeyAction>
- <KeyAction>
    <Key>HKEY_LOCAL_MACHINE\Software\Microsoft\Windows\CurrentVersion\Installer\UserData\S-1-5-18\Products\00002109511090400000000000F01FEC\Features</Key>
        <Name>SetupXmlFiles</Name>
        <Value>SWDYEXFdV=*-w'07(v8BSWDYEXFdV=*-w'0827XB</Value>
    </KeyAction>
- <KeyAction>
    <Key>HKEY_LOCAL_MACHINE\Software\Classes\Installer\Features\00002109511090400000000000F01FEC</Key>
        <Name>SetupXmlFiles</Name>
        <Value />
    </KeyAction>
```

```
        -<KeyAction>
            <Key>HKEY_LOCAL_MACHINE\Software\Microsoft\Windows\CurrentVersion\
Installer\UserData\S-1-5-
18\Products\00002109511090400000000000F01FEC\Features</Key>
            <Name>SetupControllerFiles</Name>
            <Value>SWDYEXFdV=*-w'07(v8BSWDYEXFdV=*-w'0827XB</Value>
        </KeyAction>
        -<KeyAction>
            <Key>HKEY_LOCAL_MACHINE\Software\Classes\Installer\Features\
00002109511090400000000000F01FEC</Key>
            <Name>SetupControllerFiles</Name>
            <Value />
        </KeyAction>
        -<KeyAction>
            <Key>HKEY_LOCAL_MACHINE\Software\Microsoft\Windows\CurrentVersion\
Installer\UserData\S-1-5-
18\Products\00002109511090400000000000F01FEC\Features</Key>
            <Name>MsoInstalledPackagesScopedIntl_1033</Name>
            <Value>vUpAVK+8A$-(46&xKL,P</Value>
        </KeyAction>
        -<KeyAction>
            <Key>HKEY_LOCAL_MACHINE\Software\Classes\Installer\Features\
00002109511090400000000000F01FEC</Key>
            <Name>MsoInstalledPackagesScopedIntl_1033</Name>
            <Value />
        </KeyAction>
    </Registry>
</MachineChanges>
```

In an embodiment, a PD XML file can be input to the sequencer component 102 to set high-level virtual application properties, such as image compression type, image block size (size of SFT chunks), image version, virtual product root, etc. The sequencer component 102 can receive a PD XML file and the PC component 114 can be used read the package details as part of creating a virtual package 103, such as a virtual application image for example. In one embodiment, a PD XML file can be defined according to the schema below.

```
<?xml version="1.0" encoding="utf-8"?>
<xs:schema         xmlns="http://tempuri.org/PackageDetails.xsd"
xmlns:xs="http://www.w3.org/2001/XMLSchema">
    <xs:element name="PackageDetails">
        <xs:complexType>
            <xs:sequence>
                <xs:element name="SFTHeader" maxOccurs="1" minOccurs="0">
                    <xs:complexType>
                        <xs:sequence>
                            <xs:element   name="fileVersion"   type="xs:int"   default="1"
minOccurs="0" maxOccurs="1" />
                            <xs:element   name="DateCreated"   type="xs:date"   minOccurs="0"
maxOccurs="1" />
                            <xs:element   name="DateModified" type="xs:date" minOccurs="0"
maxOccurs="1" />
                        </xs:sequence>
                    </xs:complexType>
                </xs:element>
                <xs:element name="PackageProperties" maxOccurs="1" minOccurs="0">
                    <xs:complexType>
                        <xs:sequence>
                            <xs:element name="EncodingType" type="xs:string" default="BZIP"
maxOccurs="1" minOccurs="0" />
                            <xs:element   name="BlockSize"    type="xs:int"    default="32"
maxOccurs="1" minOccurs="0" />
                            <xs:element name="ProductPath" type="xs:string" default="OfficeC2R"
maxOccurs="1" minOccurs="0" />
                            <xs:element name="ProductName" type="xs:string" default="Office
Click2Run" maxOccurs="1" minOccurs="0" />
                            <xs:element name="PackageGUID" type="xs:string" minOccurs="0"
maxOccurs="1" />
                        </xs:sequence>
                    </xs:complexType>
                </xs:element>
```

```
        <xs:element name="ServerProperties" maxOccurs="1" minOccurs="0">
          <xs:complexType>
            <xs:sequence>
              <xs:element name="ServerPort" type="xs:int" maxOccurs="1" minOccurs="0" default="80" />
              <xs:element name="SFTPath" type="xs:string" maxOccurs="1" minOccurs="0" />
              <xs:element name="ServerProtocol" type="xs:string" maxOccurs="1" minOccurs="0" />
            </xs:sequence>
          </xs:complexType>
        </xs:element>
      </xs:sequence>
    </xs:complexType>
  </xs:element>
</xs:schema>
```

The elements of the PD XML schema are as follows:

SFTHeader

A top level element including properties to set in an virtual image header.

FileVersion

This element can be used to set an internal package version.

DateCreated/DateModified

These elements can be used to override the normal date-created/datemodified values internal to a virtual image.

PackageProperties

A top level element which can be used to set properties of a virtual package.

Encoding Type

This element can be used to define how to encode a virtual application image.

BlockSize

This element can be used to define block sizes to use in a virtual application image.

ProductPath

This element can be used to define an internal location in an image as to applications files are located.

ProductName

This element can be used to define a friendly name for an application/product that will be virtualized.

PackageGUID

This element defines a global unique identifier (GUID) which can be used to identify an application/product.

ServerProperties

This element can be used to define a top level node for elements that relate to a virtual application image server, such as server 106 for example.

ServerPort

This element can be used to define a port where an image can be obtained from.

SFTPath

This element can be used to define a uniform resource locator (URL) to a virtual application image.

ServerProtocol

This element can be used to define a protocol which can be used to transfer virtual application bits.

In an embodiment, an optimization XML (OptXML) file can be input to the sequencer component 102 which can describe feature blocks 110 and/or faux feature blocks 112 to be associated with a virtual package. For example, the optimization component 118 can use an OptXML file to define which blocks application 1 needs to boot, which blocks application 2 needs to load for a spellchecker, which blocks application 3 needs to load for a pivot table, etc. The optimized feature block descriptions can be used by the sequencer component 102 to set the feature blocks and order them. An OptXML file for feature blocks FB1 and FB2 includes corresponding blocks being set to 1 or 2 appropriately. OptXML files for faux feature blocks stores the block information in faux feature block list files which can be stored at the root of an image. Feature blocks in an image can be ordered so that more commonly used blocks are downloaded before less commonly used blocks. However, when a user runs a virtual application, some feature blocks may be downloaded based on their behavior. In one embodiment, a default order for the blocks includes: FB1; Product boot faux feature blocks; faux feature blocks of priority 1, . . . , faux feature blocks of priority N; and, any remainder of FB2.

In one embodiment, an OptXML file can be defined using the schema below.

```
<?xml version="1.0" encoding="utf-8"?>
<xs:schema xmlns="http://tempuri.org/OptXML.xsd" xmlns:xs="http://www.w3.org/2001/XMLSchema">
  <xs:element name="OptXML">
    <xs:complexType>
      <xs:sequence>
        <xs:element name="FeatureBlocks">
          <xs:complexType>
            <xs:sequence minOccurs="0" maxOccurs="unbounded">
              <xs:element name="FeatureBlock">
```

```
                <xs:complexType>
                 <xs:sequence>
                  <xs:element name="Folders">
                   <xs:complexType>
                    <xs:choice minOccurs="0" maxOccurs="unbounded">
                     <xs:element name="Folder" type="xs:string" />
                    </xs:choice>
                   </xs:complexType>
                  </xs:element>
                  <xs:element name="Files">
                   <xs:complexType>
                    <xs:choice minOccurs="0" maxOccurs="unbounded">
                     <xs:element name="File">
                      <xs:complexType>
                       <xs:sequence>
                        <xs:element name="FilePath" type="xs:string" />
                        <xs:element name="FileName" type="xs:string" />
                        <xs:element name="Pages">
                         <xs:complexType>
                          <xs:choice minOccurs="0" maxOccurs="unbounded">
                           <xs:element name="Range">
                            <xs:complexType>
                             <xs:sequence>
                             </xs:sequence>
                             <xs:attribute    name="start"    type="xs:int"
use="required" />
                             <xs:attribute name="end" type="xs:int" />
                            </xs:complexType>
                           </xs:element>
                          </xs:choice>
                         </xs:complexType>
                        </xs:element>
                       </xs:sequence>
                      </xs:complexType>
                     </xs:element>
                    </xs:choice>
                   </xs:complexType>
                  </xs:element>
                 </xs:sequence>
                 <xs:attribute name="FBID" type="xs:string" use="required" />
                 <xs:attribute  name="append"  type="xs:boolean"  use="optional"
default="true" />
                 <xs:attribute name="AppGUID" type="xs:string" use="optional" />
                 <xs:attribute name="priority" type="xs:int" use="optional" />
                </xs:complexType>
               </xs:element>
              </xs:sequence>
             </xs:complexType>
            </xs:element>
           </xs:sequence>
          </xs:complexType>
         </xs:element>
        </xs:schema>
```

The elements of the OptXML schema are as follows:

FeatureBlocks Element

This element can be used to define a top level element for the associated XML file. The feature blocks fall under this element.

FeatureBlock Element

This element can be used to define a single feature block, listing all files or folders in the associated block. This element includes an attribute "FBID" which can be used to represent a feature block identifier. If the attribute is missing or is invalid, the optimization component 118 will do nothing for this feature block. Other optional attributes can include: AppGUID, priority, and append. AppGUID and priority attributes can be passed on to the faux feature block lists (FFBLists) files. The append attribute (Boolean) signals whether or not this is a new feature block, or to add a new feature block. If false, then any files in the image already assigned to that feature block can be removed. If true (default), then this feature block may already exist and the resulting feature block may have a mix of old and new blocks.

Folders Element

This element can be used to define put files in a folder (and its subfolders) in an associated feature block.

Folder Element

This element can be used to define an absolute path to a folder in the virtual file system. All files in that folder and subfolders (recursive) can then be contained in the associated feature block. If the specified folder does not exist in the virtual image, the optimization component 118 can log the details and proceed to the next folder.

Files Element

This element can be used to define a top level node for all files in an associated feature block.

File Element

This element can be used to define a file that can be in an associated feature block. If the specified file is not in a virtual image, the optimization component 118 can log the details and proceed to the next file.

FilePath Element

This element can be used to define an absolute path to an associated file in a virtual image. If the element is missing, the optimization component 118 can log an error and continue to the next file. The element can contain a Constant Special item ID list (CSIDL) corresponding to tokens that represent special folders on a machine.

FileName Element

This element can be used to define a name of a file to be included in an associated feature block. If the element is missing, the optimization component 118 can log an error and continue to the next file.

Pages Element

This element can be used to define which pages should be in an associated feature block. If the element is missing, then the optimization component 118 will include all the pages in the associated feature block.

Range Element

This element can be used to define a range of pages to include in an associated feature block. The element can include a start attribute (e.g., having a positive integer value) defining a page to start including in an associated feature block. The element can also include an end attribute (e.g., having a positive integer value) which can be optional provisioned. If present, the end attribute can be used to designate a last page of an associated range (inclusive). If the end attribute is absent or if the start attribute has a greater value than the end attribute value, then the optimization component 118 will only include the start page.

The system 100 can be implemented as part of networked, distributed, or other computer-implemented environment. The system 100 and its components can communicate via a wired, wireless, and/or a combination of communication networks. A number of client computing devices, including desktop computers, laptops, handhelds, or other smart devices can interact with and/or be included as part of the system 100. In alternative embodiments, the various components can be combined and/or configured according to a desired implementation. Moreover, one or more components of the system 100 can be implemented either in hardware or software. Also, while certain embodiments include software implementations, they are not so limited and may encompass hardware, or mixed hardware/software solutions. Other embodiments and configurations are available.

Figure 2:
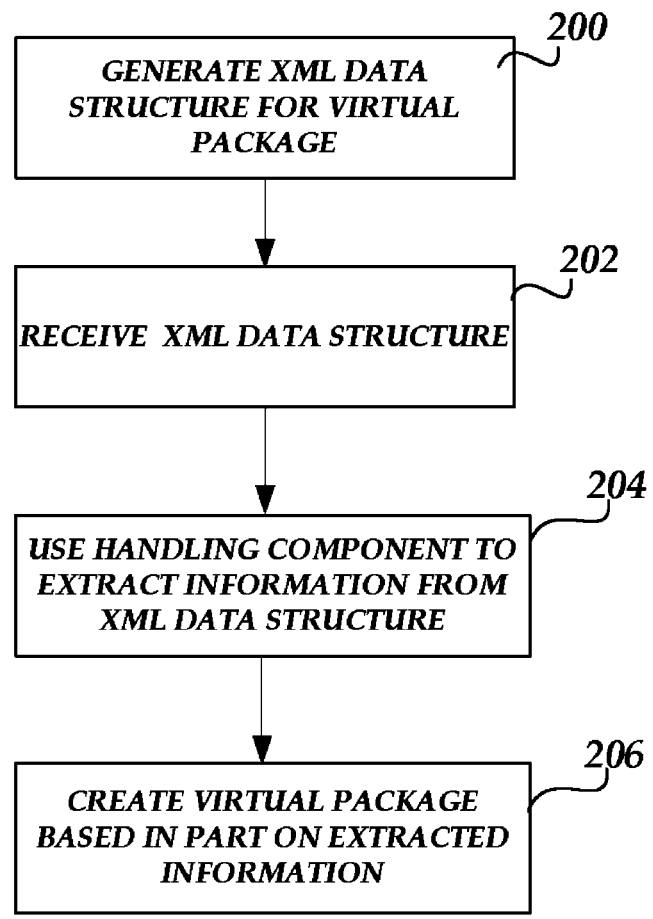
FIG. 2 is a flow diagram illustrating an exemplary process of creating and providing a virtual package.

FIG. 2 is a flow diagram illustrating a process of creating and providing a virtual package, under an embodiment. The components of FIG. 1 are referred to in the description of FIG. 2, but the embodiment is not so limited. At 200, the script translator component 120 can use information associated with one or more script files to generate an XML data structure associated with the virtual package. For example, the script translator component 120 can be used to translate a script as part of creating a customized XML file corresponding with changes made to a computing device during an installation of an installable product, such as an application or suite of applications. In one embodiment, an installer program can be used to generate installation scripts from a number of installation files, which can be used to generate an XML file. For example, the script translator component 120 can operate to remove conditional logic and other actions from a script file when generating a customized MCXML file.

At 202, an XML data structure can be input to the sequencer component 102 and used in the creation of the virtual package. In an embodiment, one or more XML files can be input and received by the sequencer component 102. For example, a MCXML file, PD XML file, and/or an OptXML file can be input to the sequencer component 102. At 204, the sequencer component 102 can use one or more handling components to handle one or more inputs based in part on a type of XML data structure associated with an input.

If a MCXML file is input to the sequencer component 102, the MC component 116 can be used to configure the virtual package with any machine-related changes. For example, the MC component 116 can be used to add and/or remove machine-related changes to and/or from the virtual package.

Likewise, if a PD XML file is input to the sequencer component 102, the PD component 114 can use the PD XML file to configure the virtual package with any associated package details. Also, if an OptXML file is input to the sequencer component 102, the optimization component 118 can be used to configure the virtual package with any optimization features. For example, the optimization component 118 can use the OptXML file to define a number of faux feature blocks to be associated with the virtual package.

Once the one or more inputs have been handled by the one or more handling components, at 206 the sequencer component 102 can create the virtual package based in part on the information provided by the one or more handling components. For example, the sequencer component 102 can use an output provided by the MC component 116 to add machine changes to the virtual package, such as for a virtual application image or virtual images associated with a suite of applications. As further example, the sequencer component 102 can use an output provided by the optimization component 118 to identify blocks to prioritize within a designated feature block when providing an application functionality as defined in the virtual package. If a package requires updating, one or more updated or new XML data structures can be input to the sequencer component 102 and used to update a virtual image or create a new virtual image. While certain embodiments and functionality has been described, other embodiments and functionality are available.

Exemplary Operating Environment

Figure 3:
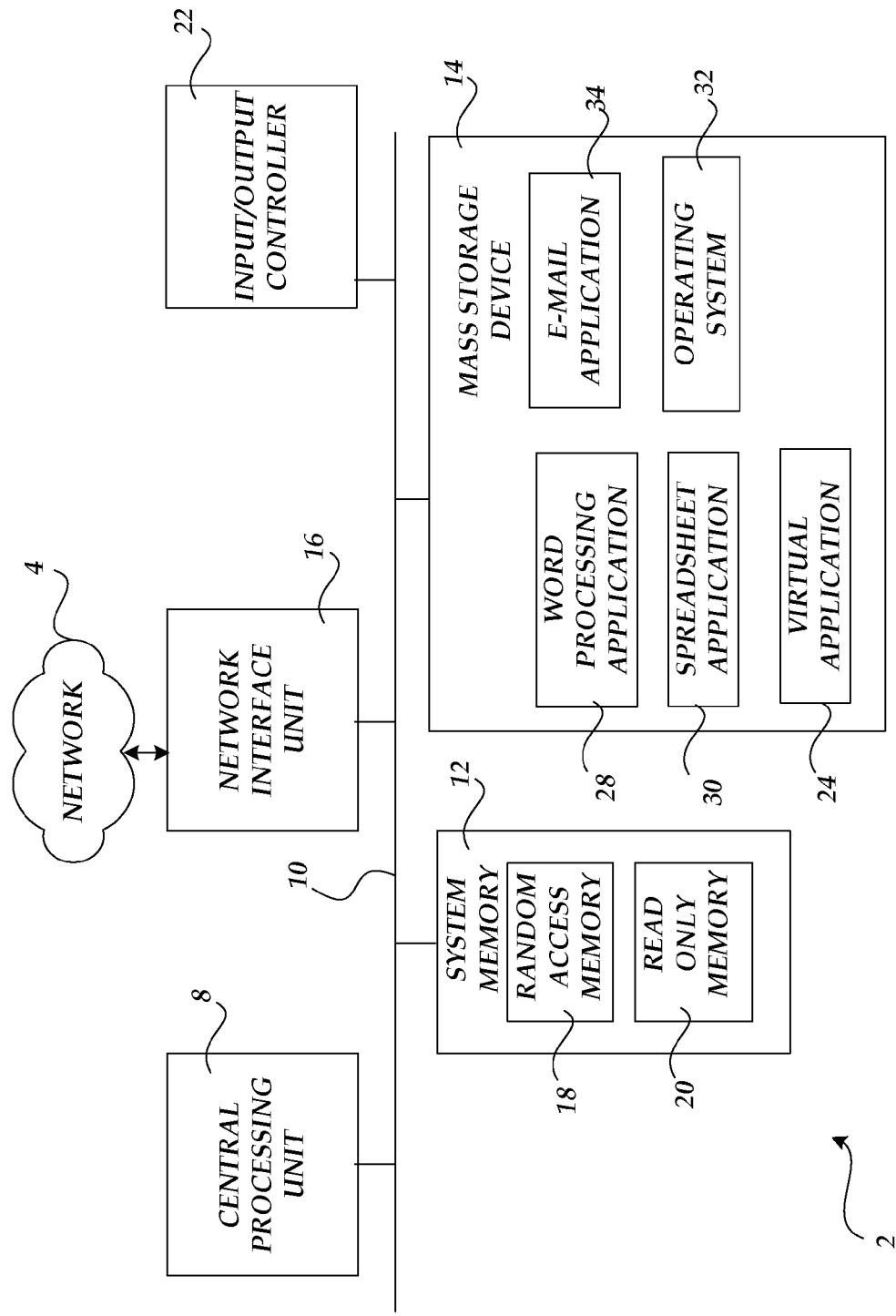
FIG. 3 is a block diagram illustrating a computing environment for implementation of various embodiments described herein.

Referring now to FIG. 3, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 3, an illustrative operating environment for embodiments of the invention will be described. As shown in FIG. 3, computer 2 comprises a general purpose desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 32, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 32 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as a virtual application 24, word processing application 28, a spreadsheet application 30, e-mail application 34, drawing application, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A system to provide a virtual package, the system comprising: a sequencer component to create the virtual package based in part on an associated application, wherein the sequencer component is configured to use one or more extensible markup language (XML) data structures which include installation changes associated with an installation of the application to create the virtual package and the sequencer component includes:
    a project creation component to use package details information to set one or more virtual application properties for the virtual package;
    a machine change component to use the installation changes in part to create the virtual package; and
    an optimization component to use optimization information that identifies one or more feature blocks and one or more faux feature blocks included within the virtual package, wherein the feature blocks comprise code and data of the application; and
the system further comprising:
    a store to store the virtual package;
    a script translator component configured to parse one or more installation scripts for installing the application and to use the one or more installation scripts to provide the one or more XML data structures which include the installation changes for input and use by the sequencer component to create the virtual package, wherein the script translator component is configured to remove conditional logic, custom actions, and other information from the one or more installation scripts as part of providing the one or more XML data structures;
    wherein the one or more XML data structures represents changes that the installation would have made to a computing device; and,
    a server computer to communicate aspects of the virtual package to a client.

2. The system of claim 1, wherein the server computer is further configured to provide bits of the virtual package based in part on user demand for a particular application.

3. The system of claim 1, wherein the machine change component is configured to use a machine change XML (MCXML) file to provide machine-related changes to the virtual package.

4. The system of claim 3, wherein the machine change component is further configured to use the MCXML file to add file, folder, and registry information to the virtual package.

5. The system of claim 3, wherein the machine change component is further configured to parse the MCXML to generate information associated with machine changes associated with the installation of the application.

6. The system of claim 1, wherein the project creation component is configured to add package details to the virtual package.

7. The system of claim 1, wherein the optimization component is configured to add feature block information to the virtual package, wherein the one or more faux feature blocks can be used to identify an optimal set of bits to download for an aspect of the virtual package.

8. The system of claim 7, wherein the one or more faux feature blocks can be used to identify a particular application feature.

9. The system of claim 1, wherein the script translator component is further configured to provide an XML file based in part on one or more scripts.

10. The system of claim 9, wherein the script translator component is further configured to identify important and unimportant records, wherein identified records can be used by the sequencer component to create the virtual package.

11. The system of claim 9, the script translator component further configured to generate a MCXML file based in part on one or more installer files.

12. The system of claim 1, further configured to order the one or more feature blocks and the one or more faux feature blocks, wherein the order includes: 1) a first feature block; 2) product boot faux feature blocks; 3) faux feature blocks of priority 1 thorough priority N; and, 4) a remainder of a second feature block.

13. The system of claim 1, further configured to host a virtualized application suite associated with the virtual package.

14. A computer-readable storage medium that does not solely consist of a signal, coupled to a computer system, including executable instructions which, when executed, provide a virtual package by performing a method comprising:
creating, by a sequencer component, the virtual package based in part on an associated application, the sequencer component using one or more extensible markup language (XML) data structures which include installation changes associated with an installation of the application to create the virtual package;
the creating comprising:
using package details information to set one or more virtual application properties for the virtual package; and
using optimization information that identifies one or more feature blocks and one or more faux feature blocks included within the virtual package, wherein the feature blocks comprise code and data of the application;
storing the virtual package in a data store;
parsing, by a script translator component, one or more installation scripts for installing the application and using the one or more installation scripts to provide the one or more XML data structures which include the installation changes for input and use by the sequencer component to create the virtual package, the script translator component removing conditional logic, custom actions, and other information from the one or more installation scripts as part of providing the one or more XML data structures; wherein the one or more XML data structures represents changes that the installation would have made to a computing device; and,
communicating, by a server computer, aspects of the virtual package to a client.

15. The computer-readable storage medium of claim 14, further comprising generating a MCXML file from an installation script associated with an installer file, wherein the MCXML represents installation changes made to a computing device absent an installation.

16. The computer-readable storage medium of claim 14, further comprising generating virtualized files, folder, and registries.

17. The computer-readable storage medium of claim 14, further comprising hosting a suite of virtual applications, including a spreadsheet application, a word processing application, a note-taking application, a database application, and an email application.

18. A method of providing a virtual package comprising:
creating, by a sequencer component, the virtual package based in part on an associated application, the sequencer component using one or more extensible markup language (XML) data structures which include installation changes associated with an installation of the application to create the virtual package;
the creating comprising:
using package details information to set one or more virtual application properties for the virtual package; and
using optimization information that identifies one or more feature blocks and one or more faux feature blocks included within the virtual package, wherein the feature blocks comprise code and data of the application;
storing the virtual package in a data store;
parsing, by a script translator component, one or more installation scripts for installing the application and using the one or more installation scripts to provide the one or more XML data structures which include the installation changes for input and use by the sequencer component to create the virtual package, the script translator component removing conditional logic, custom actions, and other information from the one or more installation scripts as part of providing the one or more XML data structures; wherein the one or more XML data structures represents changes that the installation would have made to a computing device; and,
communicating, by a server computer, aspects of the virtual package to a client.

19. The method of claim 18, further comprising storing the virtual package in the data store for accessing as part of a hosted application service.

20. The method of claim 18, further comprising updating the virtual application image based in part on updates to an installable product.

* * * * *